Dec. 24, 1957  D. F. REYNOLDS  2,817,557
UNITARY BODY AND FRAME STRUCTURE FOR AUTOMOBILES
Filed Jan. 25, 1950  8 Sheets-Sheet 1

INVENTOR.
Donald F. Reynolds
BY Harness and Harris
ATTORNEYS

Dec. 24, 1957 D. F. REYNOLDS 2,817,557
UNITARY BODY AND FRAME STRUCTURE FOR AUTOMOBILES
Filed Jan. 25, 1950 8 Sheets-Sheet 2

Dec. 24, 1957  D. F. REYNOLDS  2,817,557
UNITARY BODY AND FRAME STRUCTURE FOR AUTOMOBILES
Filed Jan. 25, 1950  8 Sheets-Sheet 3

INVENTOR.
Donald F. Reynolds.
BY
Harness and Harris
ATTORNEYS.

Fig. 4.

Dec. 24, 1957 D. F. REYNOLDS 2,817,557
UNITARY BODY AND FRAME STRUCTURE FOR AUTOMOBILES
Filed Jan. 25, 1950 8 Sheets-Sheet 5

INVENTOR.
Donald F. Reynolds
BY
Harness and Harris
ATTORNEYS.

Dec. 24, 1957 D. F. REYNOLDS 2,817,557
UNITARY BODY AND FRAME STRUCTURE FOR AUTOMOBILES
Filed Jan. 25, 1950 8 Sheets-Sheet 6

INVENTOR.
Donald F. Reynolds.
BY
Harness and Harris
ATTORNEYS.

Dec. 24, 1957         D. F. REYNOLDS         2,817,557

UNITARY BODY AND FRAME STRUCTURE FOR AUTOMOBILES

Filed Jan. 25, 1950         8 Sheets-Sheet 8

United States Patent Office 2,817,557
Patented Dec. 24, 1957

2,817,557

UNITARY BODY AND FRAME STRUCTURE FOR AUTOMOBILES

Donald F. Reynolds, Berkley, Mich., assignor to Chrysler Corporation, Highland Park, Mich., a corporation of Delaware Application January 25, 1950, Serial No. 140,474

19 Claims. (Cl. 296—28)

The present invention relates to metal automobile bodies and a novel means of associating the wheel suspensions and engine bed therewith.

The body is of the type which is self-sustaining and requires no complete chassis or underframe to support it. The bottom of the body has box-sectioned constructions formed along and in certain instances between the sides to give the body a self-sustaining rigidity thereby making it possible to eliminate the need for the usual chassis. Sub frames, attached to the front and rear of the body, do constitute vestigial traces of the conventional longitudinal frame but are beam-connected to one another only by virtue of the deep-section beam effect inherent in the truss produced by the body skin and body structural members themselves. The sub frame at the front of the body, or stub frame as it may be called, is connected at its rear end to the front underpanning of the body and is reinforced at an intermediate section by diagonal bracing which foots on the cowl and dash structure. The hood assembly is connected at its rear end to the cowl and dash structure and reinforced at an intermediate section by the diagonal bracing mentioned.

The novelty partly resides in the hood assembly and stub frame, each of which is adapted to form an independent cantilever structure. This arrangement is in lieu of fixing the hood assembly and stub frame rigidly together at their front ends in the conventional manner. Upon deflection of the hood assembly and stub frame in the same vertical direction at the same time, the stub frame can shift independently and move longitudinally relative to the adjacent hood assembly.

A commonly observed failure in the usual automotive structure appears in the form of cracks in and around the junctures of the frame side rails, front sheet metal, and frame front cross member with one another. An explanation which has been advanced is that the conventional mode of integrally attaching the front parts of the hood and frame and fabricating the front part of the frame by means of sharp angles and joints having abbreviated lengths of weld serves to aggravate any tendency in this direction and eventually bring about the undesired result. According to a feature of the present invention, the shock and impact forces due to sudden loading and unloading of the stub frame are more readily absorbed and distributed since the sharp angles and short welds of the frame front are eliminated, and the spaced hood assembly and front part of the stub frame may operate as cantilever beams independently of one another. During extreme movement the hood assembly and stub frame may operate in tandem as two beams of their respective depths rather than as a more rigid compound beam of their combined depth. Hence the prospects of avoiding frontal cracking such as may be due to fatigue, stress raisers, and repeated dynamic loadings will be improved since the parts subject to cracking will be adapted to find necessary yield in their respective mountings, to have generally well blended and substantially continuous junctures, and to be relieved of repeated and other stresses where feasible.

According to a further feature of the invention the body and sub frames are formed of a minimum number of metal parts with a view to reducing weight and cost but at the same time retaining the strength. In reducing the weight of the body the economy of the engine will be increased because there will be less dead weight to propel and if a decrease in weight can be obtained with a retention of strength, it will enable the engine to better propel the load over the highways.

According to another feature of the invention, the radiator, battery tray, engine, and stone shields for the engine are mounted to the stub frame and cowl and dash structure thereby relieving the hood assembly of the burden of supporting this additional dead weight.

Further features relate to improvements in various details of construction.

The description which will follow with reference to the appended drawings given by way of nonlimitative example, will allow a thorough understanding of how the invention can be embodied, those pecularities which appear in the drawing as well as in the text constituting, of course, a part of said invention. Thus other features will become manifest.

In the drawings:

Figures 1, 2, and 3 are exploded views of the vehicle according to the invention, taken in progression;

Figure 4 and Figures 5 and 6 are respectively plan and perspective views of the details of fabrication adjacent the engine compartment;

Figure 7 is a plan and Figure 8 a side elevation of the stub frame;

Figures 9 and 12 are sectional views in elevation looking rearwardly from certain junctures of the stub frame of Figure 7;

Figures 10 and 11 constitute a plan and side elevation of the rear of the vehicle.

Figures 1, 9:
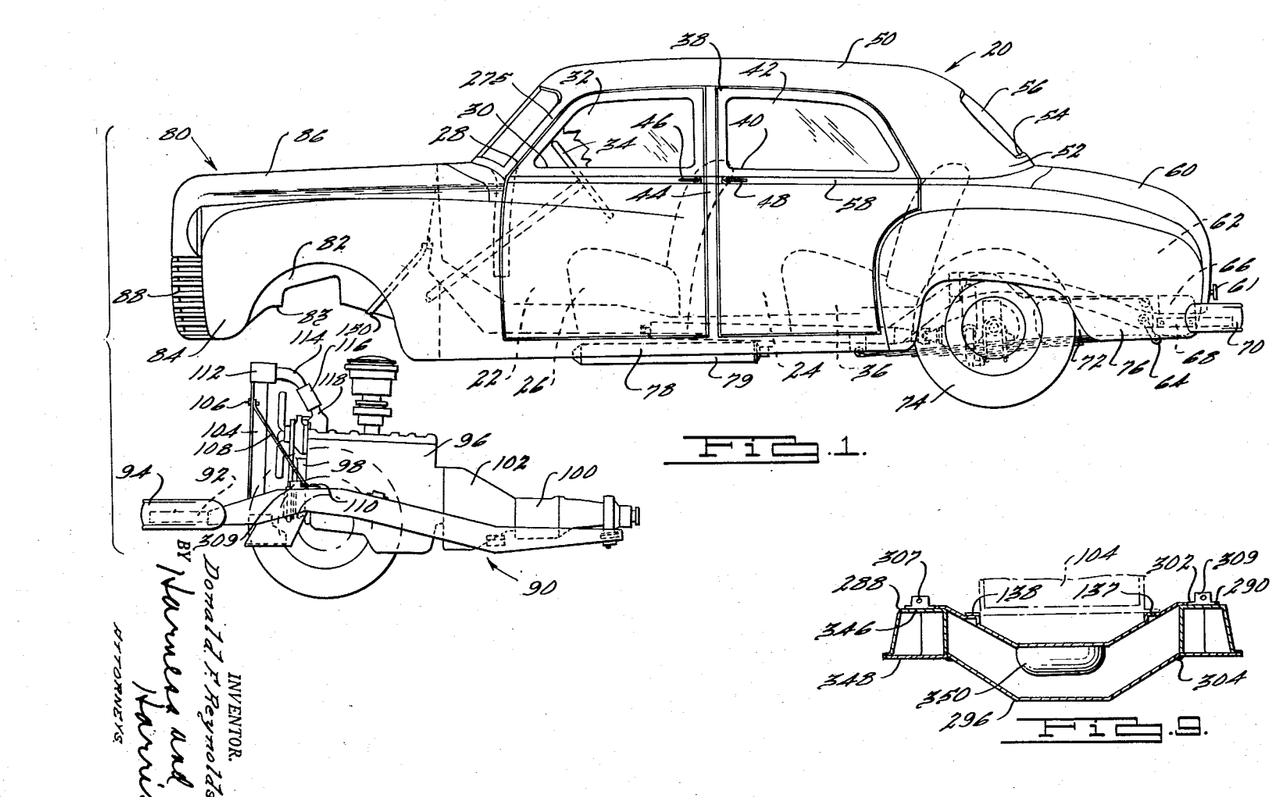
Figure 2:
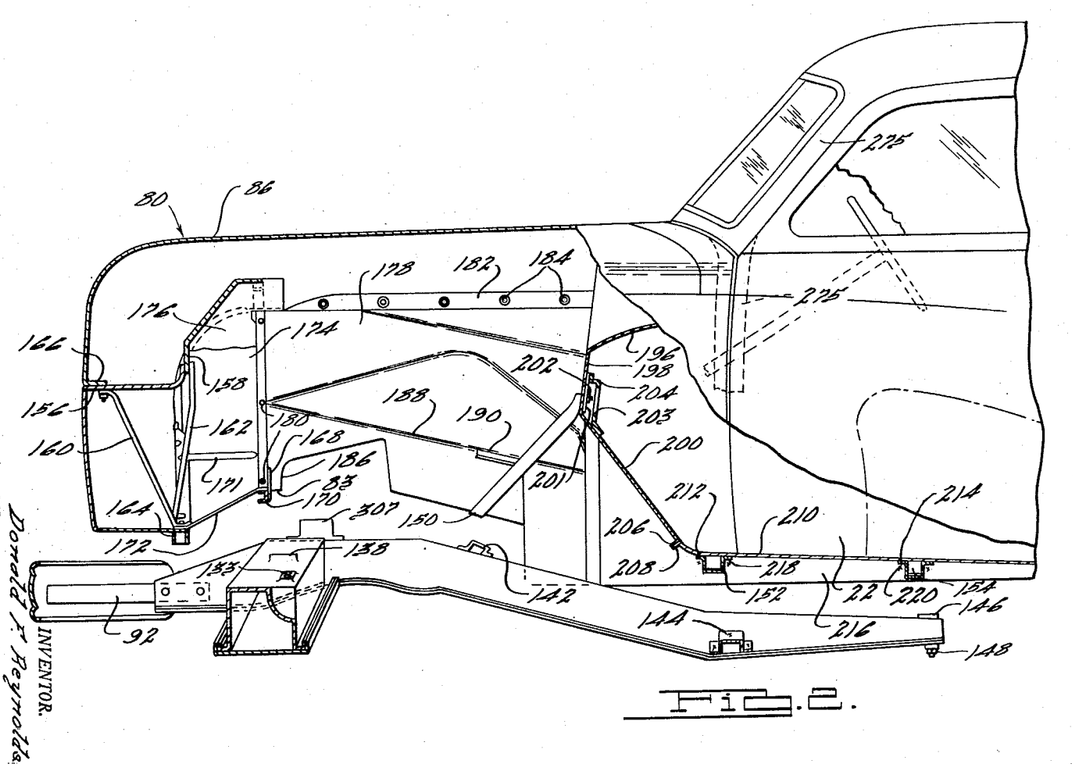

As shown in Figures 1, 2, and 3, a vehicle according to the invention may comprise a body indicated as a whole at 20, having a forward or driver's compartment 22 and a rearward or passenger compartment 24. A seat 26 is provided in the forward compartment and another seat 36 provided in the rearward compartment. A front door 28 is hung so as to close part of the side of the vehicle and has a window opening 30 in which may be provided a glass 32. Behind the glass may be observed a steering wheel 34 for the vehicle. Rear door 38 has a similar window opening 40 fitted with a glass 42. Body pillar 44 separates the two doors and provides thereon striker plates, not shown, for cooperation with the door locks operated by handles 46 and 48. The top 50 of the vehicle is provided at its rear portion 52 with a window opening 54 receiving a window 56. The so-called belt line at the base of the vehicle top 50 may be suitably trimmed by a molding such as at 58. In the rear of the vehicle body a deck lid 60 may be opened by operating lid lock handle 61 to provide access to a compartment 62 providing stowage space. The rear of the vehicle is supported on a hanger 64 in the rearward vicinity of the portion of the stowage space reserved for the spare tire 66. Bumper support members 68 support a bumper 70 for the rear of the vehicle. To the rearward of the rear wheel 74 and under the rear fender 76 may be seen a gas tank 72. Centrally of the vehicle body and medially of the body sill member 78 is located a muffler 79.

The front sheet metal generally composing the hood assembly of the vehicle shown at 80, may include a side shield 82 having a lower margin 83, a front fender 84, a nose framework 88 with similar members on the opposite side of the car, together with a pivoted door 86 for the hood. The stub frame unit generally shown at 90 has a bumper support 92 on which is mounted the front bumper 94. The engine 96 constituting the power plant of the vehicle is supported at its front on the stub frame by engine support 98 provided with an interposed resilient member 99 suitable for damping out engine vibrations. Another engine support which with front support 98 constitutes the engine bed, is located in the vicinity of transmission 100 and the coupling means 102 for the latter. The rear engine mounting is likewise connected to the stub frame. Radiator core 104 is mounted at its base to the stub frame and supported through a fastener 106 connecting it firmly to members 108 mounted at their rear end by a fastener 110 to the stub frame. The intake header 112 for the radiator is provided with a fitting 114 connected to a fitting 118 on the engine by a flexible hose 116. At the forward end of the crankshaft of the engine is mounted a harmonic balancer 120 and a sheave 122. Over sheave 122 is trained a belt 124 effectively driven by the crankshaft to rotate another sheave 126 mounted in the upper part of the engine. Sheave 126 in turn drives a coolant circulation pump 128 and an air circulating fan 130. Exhaust from the engine is passed rearwardly through an exhaust conduit 132 and delivered into the muffler 79. An oil pan 134 is disposed medially of the vehicle adjacent front wheel 136. A flat, indicated at 133, and an opposed flat 135 on the stub frame receive the bases of the motor support 98 previously discussed. Upset embossments 138 also formed on the stub frame are adapted to receive fasteners 140 by means of which the bracket 139 on the radiator core is firmly mounted to the stub frame. In the assembly showing as for instance in Figure 3, it is to be noted that a physically unoccupied space exists between lower margin 83 of the front sheet metal and the upper edges 141 of the stub frame structure.

The stub frame and body are connected by yieldable mountings, three to a side, which are respectively indicated at 142, 144, and 146. A fastener such as at 148 provides for coupling these mountings and complementary mountings on the body, three to a side, shown at 150, 152, and 154. The nose framework of hood assembly 80 embraces lock-supporting parts 156 and 158, which are reinforced by bracing shown at 160 and 162. The bracing just described foots at a channel member 164 extending transversely of the nose framework and terminating laterally short of the frame side members and bumper support 92 so as to be structurally free thereof. Hood door 86 has a part 166 complementary to lock supporting part 156 and seating thereon when the hood is locked in place. The lower side shield 168 for the radiator has a transverse channel portion 170, which together with the radiator side shield 174 and the radiator upper side shield 176 is fastened at locations such as at 180 to the forward end of the side shield 178 for the fender. Radiator side shield 174 may be formed at an intermediate portion with a reinforcing embossment 171 and at the lower margin with a flange 172. It will be apparent from Figure 3 that transverse channel portion 170 and flange 172 are vertically spaced above the top surface 173 of the frame members and at its forward end the flange 172 passes inwardly of the frame to a connection with channel member 164 likewise medially spaced to the frame. An inwardly offset longitudinal flange 182 carried by front fender 85 of the vehicle supports side shield 178, Figure 2, along the upper edge of the latter by attaching means comprising fasteners 184. A portion of the side shield is removed as at 186 to provide proper clearance for the wheel suspension parts of the vehicle. Side shield 178 has an inwardly offset portion 188 accommodating the front wheel of the vehicle and provided with an attaching bracket 190 thereon. The attaching bracket is in turn supported by diagonal bracing, later to be described more fully in detail. The cowl and dash assembly includes a cowl structure 196 connected to the dash 198, a transverse member having a toe board portion 200. The diagonal bracing supporting the bracket 190 for the side shield may be connected by a fastener 202 at its upper end to a plate 201 welded to the cowl and dash structure at a portion therealong reinforced by transverse section part 204 provided at 203 with lightening holes. Toe board 200 of the cowl and dash structure is provided with a flange 206 at its lower edge which may be riveted or welded to a complemental flange 208 formed along the front edge of underpan 210. Underpan 210 forms the enclosure for the forward part of the driver's compartment and is suitably reinforced transversely by members 212 and 214 and by longitudinal sill members such as at 216. These transverse and longitudinal members are rigidly joined to one another as by welding at 218 and 220 or other convenient means. The members carried by the underpan are to be observed integral of the body and not a part as such of any chassis construction.

Figure 4:
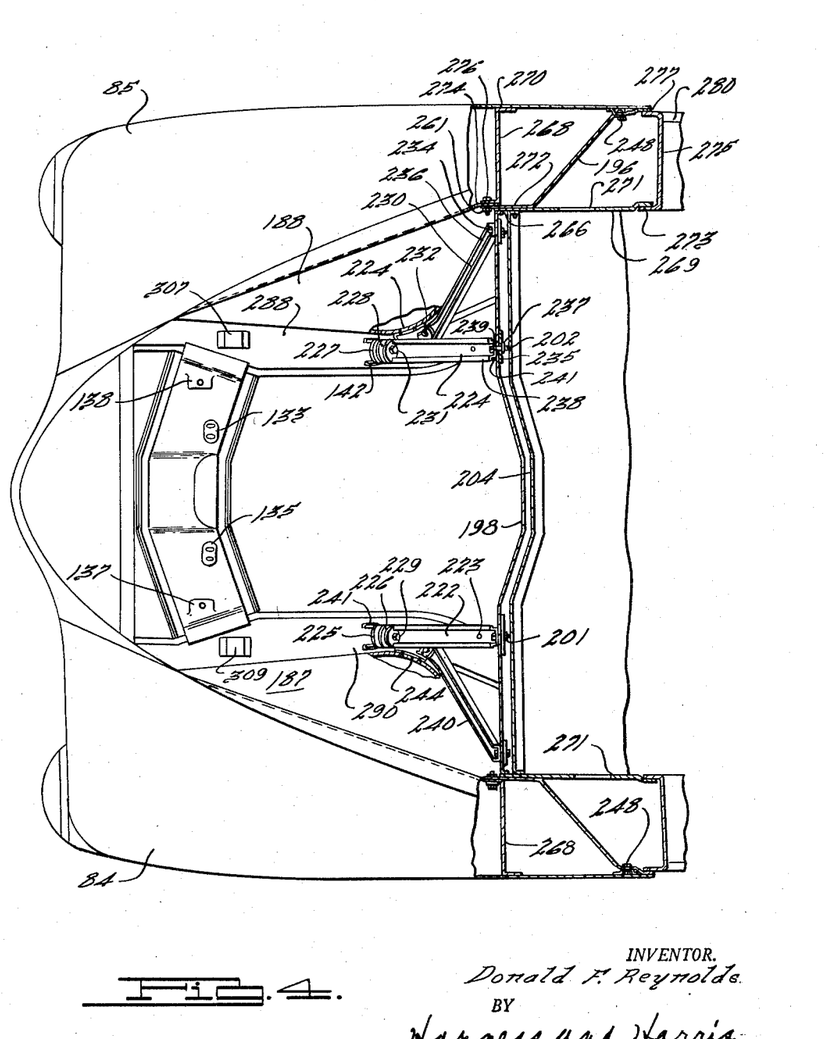
Figure 5:
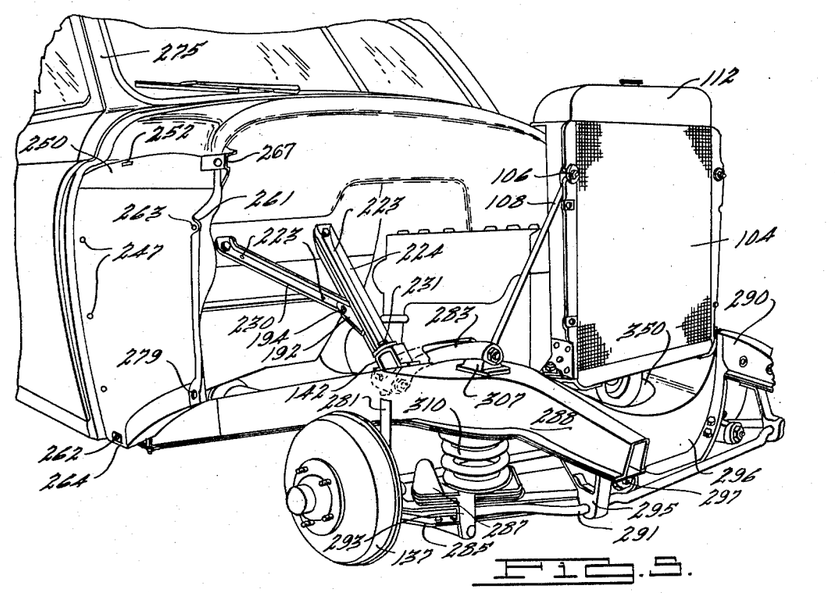
Figures 6, 12:
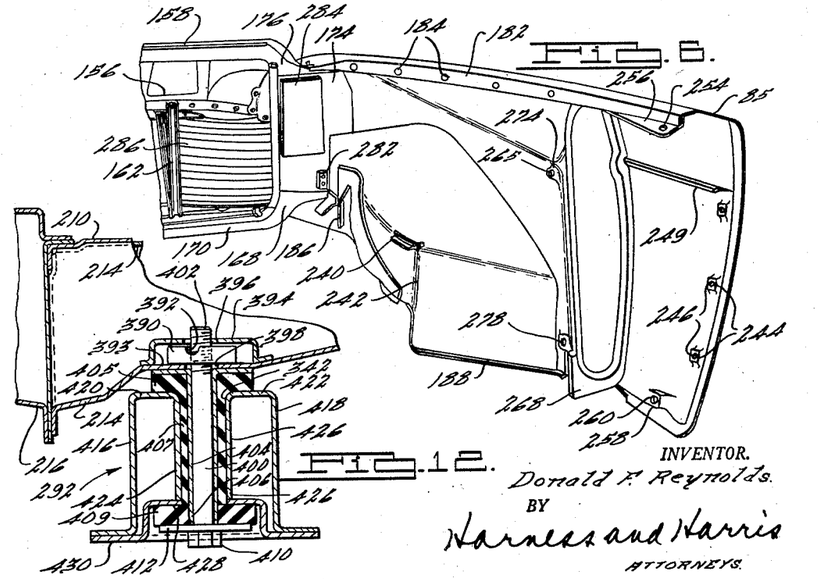

In regard to Figures 4, 5, and 6, the diagonal bracing between the cowl and dash structure and the stub frame includes braces 222 and 224 which though inclined rearwardly lie substantially in the same vertical plane with the respective cantilever-like supported ends 288 and 290 of the stub frame. Member 222 is connected at its lower or base end to mounting bracket 141 on the stub frame by a resilient cushion connection which is formed by fastener 229 and interposed rubber-like or plastic blocks 225, and 226. A similar resilient coupling is provided at 227 and 228 between brace 224 and the stub frame. Suitable openings 223 may be formed in diagonal brace 222 and auxiliary brace 240 and a battery tray or the like may be firmly connected thereby for support to the bracing. Auxiliary braces 240 and 230 lie in the same diagonal plane as braces 222 and 224 but are offset laterally outwardly thereof. Auxiliary brace 230 may be connected at its lower end by means of a fastening bracket 232 to brace 224 or else made integral with the latter. Upper end 236 of auxiliary brace 230 is connected by a fastener at 234 to the cowl and dash structure. Upper end 238 of brace 224 and the upper end 236 of brace 230 lie at the same level along the cowl and dash structure 198 and are similarly fastened by elements such as 201 and 202. The connection at fastener 202 is typical for the upper ends of the braces. A nut plate 235 is welded or otherwise attached to dash 198 in the general vicinity of transverse section part 204 if not beneath it. A threaded nut 237 is provided in affixation to the nut plate as by welding and lies in registry with openings 239 and 241 in the dash and nut plate. When fastener 202 is passed through openings in brace 224, the dash, and the nut plate, its shank is threaded into nut 237 to produce a firm and solid connection for the foot of the bracing. Transverse reinforcement 204 serves to reinforce the cowl and dash structure generally adjacent each point of juncture of the bracing therewith.

The inwardly offset portion 242 of side shield 188, Figure 6, is provided with a bracket 240 which is received on the brackets such as noted at 242 as provided on the diagonal bracing. The fenders, of which fender 85 is illustrative, may be provided with raised embossments 244 of which apertures 246 formed therein, register with similar apertures 247 on the cowl and dash structure for use in providing support for the fenders. These apertures receive a fastener 248. Rib 249 may be formed to serve as a longitudinal for fender 85. A depressed portion 250 is provided in the cowl and dash structure and an aperture 252 formed therein which registers with a similar aperture 254 formed on an inwardly offset bracket 256 carried by fender 85. Another inwardly offset embossment 258 on the fender is provided with an opening at 260 which registers with a complemental opening 262 provided in an embossment 264 formed on the cowl and dash structure at the lower part thereof. A stone shield 268 for fender 85 is connected thereto by fastening elements or welding as at 270. Stone shield 268 effects an inward connection as by a fastener 276 in conjunction with a weld to the rear mounting embossment 274 formed on side shield 188 and also to a lug 261 on the cowl and dash structure. Suitable apertures 263 and 265 are provided respectively in the lug and embossment for receiving fastener 276. A similar apertured lug 279 and registering embossment 278 are formed lower down on the cowl and dash structure and side shield. A hood door hinge bracket is shown at 267. Lug 261 is mounted at the welded juncture 266 of transverse dash 198, portion 272 of cowl 196, and cowl reinforcing or bracing structure 269 lying medially to the cowl. Cowl 196 may be seam welded to bracing structure 269 at the point of attachment of the latter with transverse bracing 204 juxtaposed to the dash, and spot welded in other locations with bracing 269 above and below. Cowl reinforcement 269 may be provided with lightening holes 271 and at its rear is lapped over at 273 and joined with body forward pillar 275. Another lap joint at 277 of the pillar 275 with cowl 196 facilitates the introduction of thrust forces from the brace footings on dash 198 into the body pillars. Pillar 275 is rabbeted at 280 to receive the body door edges. The radiator upper side shield 176 and the side shield 174 for the radiator are attached to the side shield 188 for the forward compartment. A horn mounting bracket 282 and a hand hole cover 284 are mounted on the radiator side shield 174. Grille work 286 serves in effect to complete the nose structure and provides a compartment in which the vehicle horns, for example, may be installed. It is to be noted that the radiator shields, while they do serve as shields for the radiator, are in nowise connected thereto inasmuch as the former is carried by the hood assembly and the latter is carried by the stub frame.

The wheel suspension may be conventionally mounted to the frame in the vicinity of frame cross members 296 as is particularly brought out in Figure 5. Wheel 137 is mounted at its hub for rotation on a steering knuckle carried by knuckle support 281. Support 281 is carried at one end by the control arm 283 which is pivoted to embossment 307, and at the other end by lower control arm 285. Seated on lower control arm 285 are a bumper 287 and coil load spring 310. Stabilizer bar 291 mounted by a resilient connection 293 to the lower control arm, is carried in resilient bushings 295 depending by brackets from frame side rail 288. Lower control arm 285 is pivoted at 297 to swing from cross member 296. A shock absorber, not shown, may be provided having attachment to the linkage just described at points susceptive of differential movement, for instance, with one end of the shock absorber connected to arm 281 and the other end connected at a spaced location on arm 283.

Figures 7, 8:
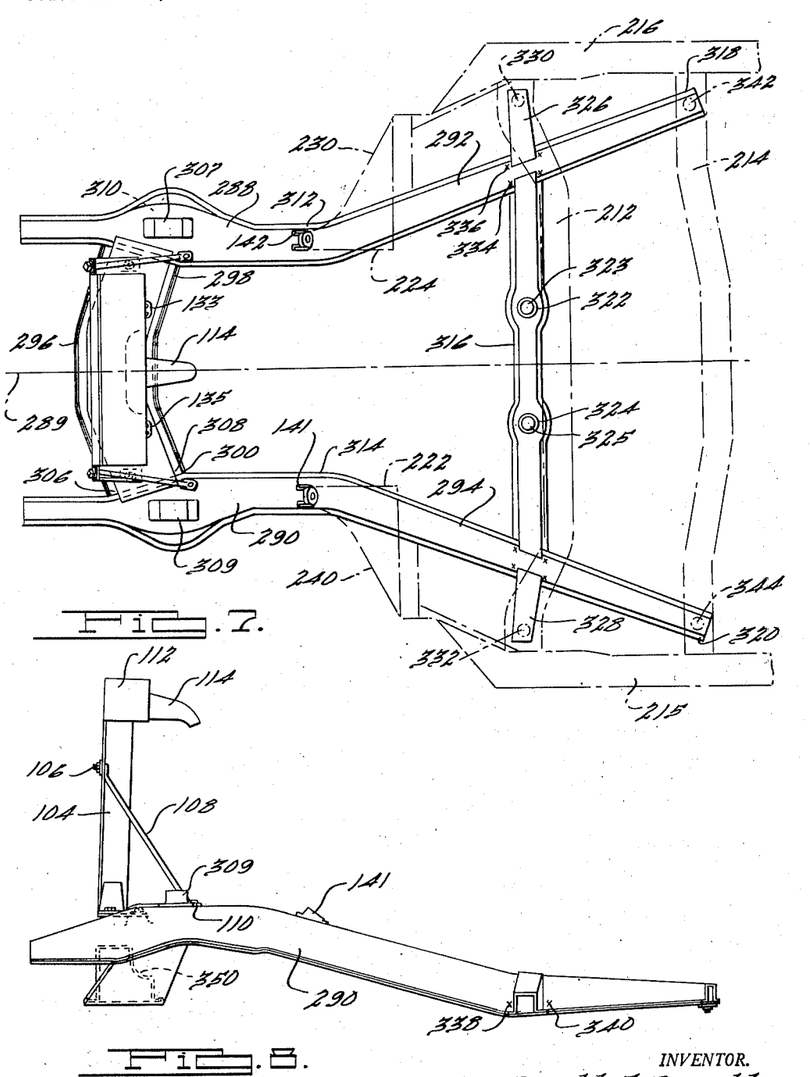

In regard to Figures 7, 8, and 9, the stub frame has substantially parallel front portions 288 and 290 which are also substantially parallel to the longitudinal axis 289 of the vehicle. The rear portions of the stub frame comprise rearwardly diverging arm members 292 and 294. The stub frame cross member 296 connects the parallel side portions 288 and at its outer end 298 and 300 the cross member is connected by the continuous weld 302, 304, 306, and 308 such that the end 300 of cross member 296, for example, effects a solid connection of long weld length to the side rail 290. Formed in side rails 288 and 290 may be chambers for the reception of coil load springs 310 and provided substantially thereabove may be embossed parts 307 and 309 for supporting portions of the wheel suspension. A transition or intermediate section of the stub frame is indicated at 312 and 314 which serves to connect the forward and parallel rail portions to the rearwardly diverging side rail portions 292 and 294. Forwardly of the transition sections 312 and 34 the stub frame acts as an independent cantilever beam whereas from the transition sections 312 and 314 rearwardly the stub frame is positively connected to the body structure. A frame cross member 316 is located intermediate the front and rear ends of the rearwardly divergent side rails such as to lie forwardly of their free ends 318 and 320. Formed on cross member 316 are motor mounting sections 322 and 324 carrying resilient cushions or pads 323 and 325 by means of which the power plant is yieldably cradled adjacent its transmission. Cross member 316 has lateral extensions 326 and 328 provided with connection apertures 330 and 332 by means of which attachment is effected to the cross members of the body underpan shown at 212. Body cross members 212 and 214 are connected to sills 215 and 216 carried by the body as by welding or riveting. The end portion 318 of the divergent side rail 292 and the end portion 320 of divergent side rail 294 are provided with connection apertures 342 and 344 for attachment to the body cross member 214. The points of attachment are inwardly offset somewhat from the connection of the body cross member 214 to sills 215 and 216 and generally longitudinally and transversely aligned. By liberal welds such as at 334, 336, 338, and 340 the cross member 316 of the stub frame may be rigidly secured to divergent side rail portions 292 and 294. As viewed particularly in Figure 9, the parallel side rail portions, of which side rail 288 is an example, are formed of an inverted U-channel-shape 346 the bottom part of which is fitted to a closing plate 348. Cross member 296 is formed with a depressed well 350 which provides a recess in which the harmonic balancer of the engine and the fan belt sheave may be received with adequate clearance.

Figure 10:
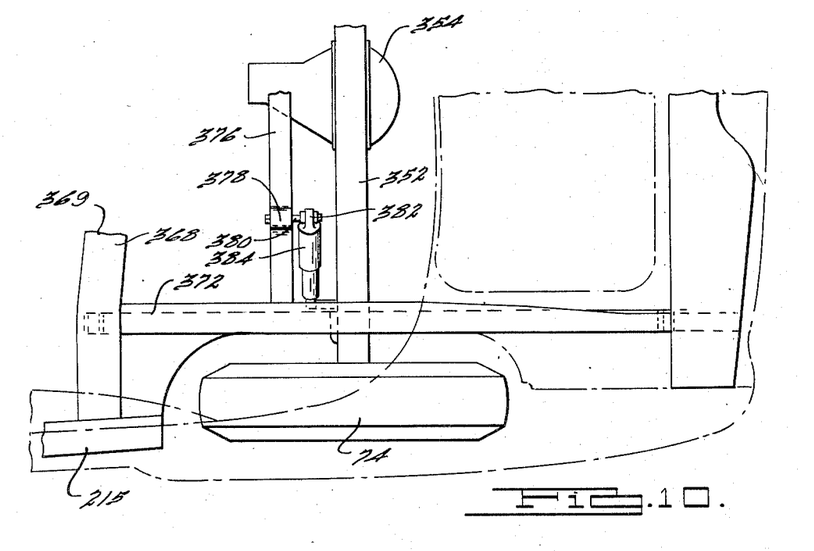

In regard to Figures 10 and 11, an axle housing 352 is shown disposed intermediate rear wheels 74 and 75. Centrally of the axle housing is a differential 354 and rotatable therein are provided axles 355 for turning the rear wheels. Housing support 356 firmly holds axle housing 352 and is mounted by means of U-bolts 358 and bracket 359 to a rear spring 360 of the longitudinal type. The forward end 362 of the rear spring is connected by a suitable pin 366 which is bushed in a bracket 364. Bracket 364 is mounted to a channel cross member 368 attached to the body of the vehicle and firmly affixed to underpan portion 370. A sill 215 reinforces the side edges of underpan 370 and is connected to cross member 368 at one end and a corresponding sill 216 is connected at the channel 368 at its opposite end. In order to provide proper reinforcement to the body of the vehicle in absence of a conventional chassis a rear heavy longitudinal 372 is provided and welded at its front end to channel 368. Another body cross member 376 is upset to form an embossment 378 carrying a pin 380 received in the eye 382 of a shock 384. The lower eye of the absorber 386 suitably bushed, fits over a stud 388 carried by the U-bolt mounting bracket 359 on the longitudinal spring. The rear portion of longitudinal 372 is shown at 386 as extending rearwardly where it effects connection with a hanger carried by the longitudinal spring 360.

With respect to Figure 12 particularly in light of Figure 7, the divergent side rail portion 292 of the stub frame is shown as effecting connection with the body cross member 214 in spacing to body sill 216. Such connection is illustrated as typical of connections at 330, 332, 342, and 344. Body cross member 214 is provided with a bolt topping plate 390 suitably threaded at 392 and held to limited shifting movement on flat 393 by a bracket 394 apertured at 396. A similar aperture 398 is provided in flat 393 of the body cross member such that a bolt 400 threaded at 402 may be passed through the registering apertures and threadably received by the topping plate. A sleeve 404 is fitted around the bolt and has an end 406 slightly shorter than the effective length of the bolt prior to the bolt being drawn down. The sleeve 404 has a flange 408 at its upper end on which is received a rubber-like cushion or block 405 having an elongated shank 407 surrounding the shank of the bolt and sleeve 404. Surrounding the end 406 of the sleeve is another rubber-like cushion or block 409. The blocks thus provided serve to insulate the bolt and sleeve completely from the divergent side rail portion 292. A suitable washer 412 is interposed between the head 410 of the bolt and block 409. The divergent side rail portion 292 has upright walls 416 and 418 and top walls 420 and 422. The inner walls 424 and 426 which depend from walls 422 and 420 and define the opening 342 are joined at their lower portions with upset wall structure 428 formed in the closing plate 430 and defining a recess holding block 409. When the bolt is drawn down tight, blocks 405 and 409 are compressed into pre-stressed state until sleeve portion 406 and washer 412 engage; the body cross member and the divergent side rail portion 292 are then effectively insulated one from the other by yieldable material such that a resilient connection is afforded albeit a firm connection results.

In the operation of the device of Figures 1 through 12, the body 12 of the vehicle serves as the main structural element and its own members, including of course the body skin, pillars, underpan, underpan cross members, and sills, serve in effect as a truss. The forward end of the truss is mounted to the intermediate and rear sections of the stub frame. The diagonal bracing 222, 224, 230, and 240 serves to transmit the loading from the wheel suspension and stub frame up through the cowl and dash structure to the body pillars and other truss work. Owing both to the somewhat resilient connections of the stub frame to the body and to the cantilever beam effect of the forward part of the stub frame, sudden loadings from the wheel suspensions transmitted to the stub frame are resiliently accommodated such that sudden shocks to the stub frame do not have a tendency to become manifested by cracks. The forward part of the hood assembly from bracing 222, 224, 230, and 240 forward serves itself as a cantilever beam such that at least in a vertical direction, bodily shiftable movement of the forward ends of the stub frame and the hood assembly are possible inasmuch as the structural elements are in effect swinging in limited arcs having different centers. It may be found advantageous to interpose rubber or other bumpers in the structurally free gap between the forward part of the stub frame and the hood assembly in order that no rattling will occur on extreme vertical motion of the parts toward one another but it is important that the hood assembly and stub frame should not act as a compound rigid beam and that the stub frame should be free to oscillate vertically so that its movement is neither effective upon nor affected by the hood assembly. Hence during travel of the vehicle the unique behavior will be observed that although the wheel assemblies and portions of the stub frame adjacent thereto are undergoing considerable vertical displacement, the unengageable hood assembly will appear to the driver to be relatively stable and immobile. If both front wheels of the vehicle encounter a depression or rut at the same time, then the stub frame and suspensions may temporarily deflect downwardly without of necessity taking down with them the independently supported hood assembly inasmuch as they are not connected for vertical movement one with the other.

Figures 13, 14:
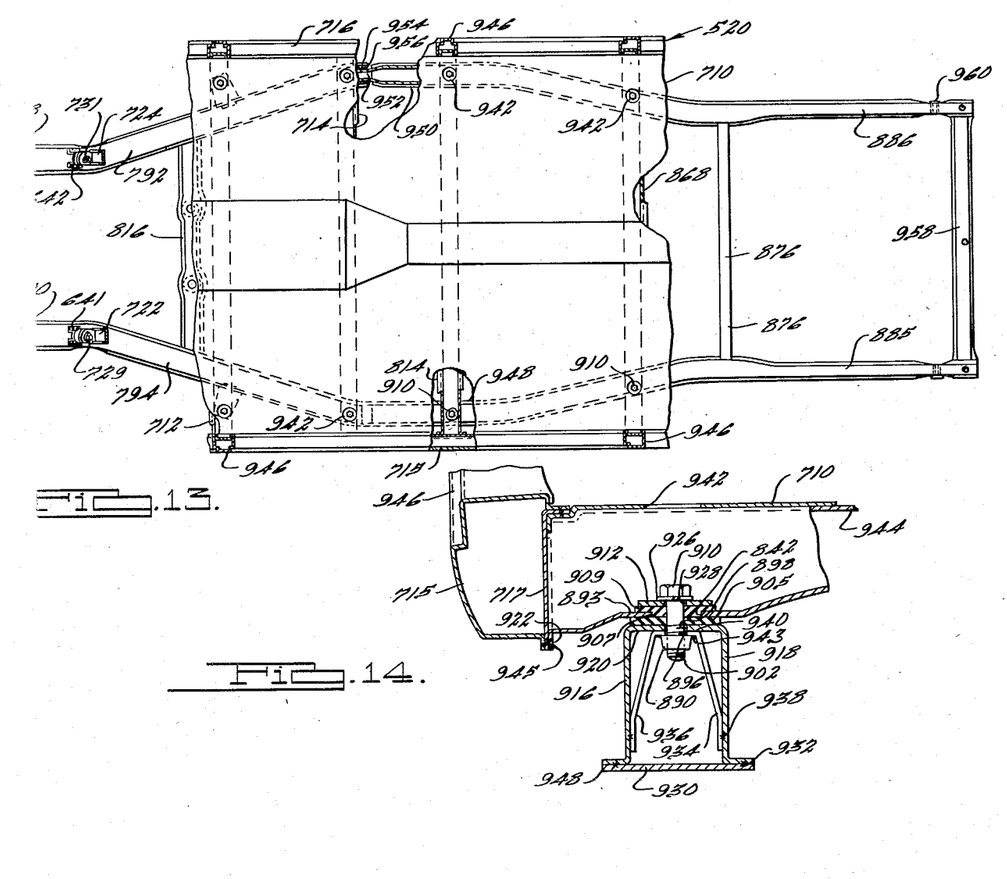
Figures 13 and 14 show a modified form of construction.

In Figures 13 and 14 the invention is shown as it may be applied within its broader aspects. The vehicle construction there represented includes a frame having spaced side rails extending toward the front and rear ends thereof and being formed of front and rear sections provided respectively with cross members 796, 816 and 876, 958. The front section is in essential respects, of the same construction as the stub frame previously described. Parallel side rail portions 788, 790 and divergent side rail portions 792, 794 are connected by a curved transition side rail portion on which are mounted brackets 642 and 641. Suitably bolted to these brackets by bolts 731 and 729 are the lower ends of diagonal bracing 724 and 722.

The diagonal bracing is adapted to bear against the dash of the body and to foot on the frame on rubber insulators in the fashion of the stub frame described. The rear section of the frame includes central side rail portions 950 and 948 having inwardly offset wall portions such as at 952 adapted to be telescopically received by the end portions 954 formed on divergent side rail portions 792 and 794. This juncture in the form of a splice may be made permanent as by means of welding or riveting, indicated at 956. Connected to the central side rail portions and forming an extension thereto are rearward side rail portions 886 and 885 which are strengthened laterally by the frame cross members 876 and 958 noted. Formed in the side rails adjacent cross member 958 is a bushing 960 in which may be received a rear spring shackle or the rear spring proper. Mounted upon the frame is a vehicle body 520 having an underpan structure comprising an underpan sheet 710 for the passenger compartment. Along the edges of sheet 710 are provided body sills 716 and 715 which are laterally offset as respects the frame side rails. Below the general level of underpan sheet 710 are provided transverse structures which are joined to the body sills 716 and 715. The transverse structures are indicated as at 714, 814 and 868 as being flanged and of a substantially channel or U-shaped construction. Openings 942 provided in underpan sheet 710 serve to provide access to a plurality of bolts 910 used to connect the transverse members of the body to the frame side rails 716 and 715. Spaced upright body pillars 946 rise from a juncture with the body sills at spaced intervals therealong generally adjacent the transverse body members. The body joint adjacent one of the bolts 910 is particularly brought out in Figure 14. Body post 946 is carried on sill 715, which has a vertical plate 717 welded thereto. To plate 717 are joined the underpan sheet 710 and the transverse body member having the flange 944 welded to the underpan sheet. By suitable welding, as at 945, the flange 922 of the transverse member is firmly secured to the plate 717 and the body sill 715. The opening 942 provides access for a suitable tool for manipulating bolt 910. The transverse body member has a flattened portion 893 providing a body-supporting wall in which is formed an aperture 842. Within this aperture is received a rubber-like insulator having a shank 907 and a flanged portion 909. Owing to the presence of a washer 912 and a lock washer 926 the bolt 910 may be drawn tight to compress the rubber insulator just described. A companion insulator 905 is interposed at the region of the shank of bolt 910. Insulator 905 may be in the form of a rubber block or strip cemented or otherwise affixed to a companion horizontal wall 920 provided by the frame side rail portion 948. In the horizontal wall portion 920 of the side rail is formed a bolt opening 898 vertically through which the threaded end 902 of the bolt passes. A nut 890 for the reception of the bolt is firmly affixed within the side rail as by welding 943 such as will prevent any movement of the nut relative to the side rail. As may be useful in holding the nut and in reinforcing the side rail, an internal bracket is provided having a part 940 in adjacency to the nut and the transverse body member. Legs 934 and 936 of the bracket may be secured within the hollow side rail by welding or other bonding, as indicated at 938, to the side walls 918 and 916 of the side rail. A suitable closing plate 930 may be affixed to the open side of the side rail to flanges there provided as by welding at 932. By the resulting structure the bolt 910 will be noted to be enclosed at either end within hollow members and to be shielded from external conditions.

The operation of the forward section of the frame just described will be very similar to that of the stub frame. At the location of the splice between the two sections, the frame as a whole may be shortened or lengthened by the removal or addition of side rail portions and the frame giving a general utility for use within a range of wheelbase limits. The assembly problems are seemingly reduced to a minimum inasmuch as the transverse members of the body may be bolted directly to the frame from within the body rather than from within the body and at the same time from below the body and frame where it is necessary to hold fast the nut carried on the frame side of the joint. No part of the bolt will be exposed to the elements once assembly has been completed and there will be little occasion to operate the nut 890 at all by means of which the body and frame are bolted together. Transverse members of the body are disposed on both sides of the splice and will serve to hold the frame sections together in either event whether an extension is added at the splice or a portion of the side rail removed at the splice in order to compensate for the wheelbase desired. Inasmuch as the front section of the frame may be utilized to serve the functions of the stub frame, the central sections of the frame 950 and 948 may be of relatively light construction since the body proper of the vehicle will act itself as a main structural element of the effective truss between the front and rear wheels. Rubber insulators surround the body bolts 910 and are compressed as these bolts are drawn down such as to form a secure joint yet to insulate chassis vibrations from the vehicle body.

It will be understood that any embodiment just described has been given only by way of example and it can be altered to the extent as will occur to those skilled in the art without by so doing departing from the scope of the invention.

What is claimed is:

1. For use with a vehicle characterized by a body, a stub frame having substantially parallel side rail portions one for each side of the vehicle, a cross member secured therebetween for cooperation in providing front wheel suspension support, rearwardly divergent side rail portions for each side of the vehicle forming rearward continuations of the parallel side rail portions and having means associated adjacent the juncture thereof with the side rail portions operably connectible with the body, said rearwardly divergent side rail portions having free rear ends for effecting connection with the body, and a cross member secured to said rearwardly divergent side rail portions at locations spaced from the free rear ends thereof and having ends extending laterally of the same rearwardly divergent side rail portions for effecting connection with the body.

2. For use with a vehicle characterized by a body, a stub frame having substantially parallel side rail portions one for each side of the vehicle, a cross member secured therebetween for cooperation in providing front wheel suspension support, rearwardly divergent side rail portions for each side of the vehicle forming rearward continuations of the parallel side rail portions and having means associated adjacent the juncture thereof with the side rail portions operably connectible with the body, said rearwardly divergent side rail portions having free rear ends for effecting connection with the body, and a cross member secured to said rearwardly divergent side rail portions at locations spaced from the free rear ends thereof.

3. In motor vehicle structure having a driver's compartment provided in the body thereof: pillars at each side of the forward end of said compartment, cowl and dash structure forwardly of said compartment structurally secured to said pillars, underpan structure under said compartment connectibly supporting said cowl and dash structure and pillars and comprising longitudinal sill members and transverse channel-like reinforcement members therebetween; diagonal strut means fastened to the cowl and dash structure and having end portions projecting generally downwardly and forwardly thereof; front chassis sub-assembly comprising a stub frame having a portion providing front spring suspension for the vehicle and an engine supported by the stub frame, said stub frame being formed with spaced side rails having rear end portions both connected to members in said underpan structure and being connected at a location intermediate the rear end portions and spring suspension to said end portions of the diagonal strut means; hood assembly having an engine compartment and comprising side shields and fenders at the sides thereof constituting front wheel houses, nose framework at the front of the engine compartment, and hood door structure; means disposed for supporting the hood assembly fastener-free of the front chassis sub-assembly from the vicinity of the diagonal strut means forwardly in a manner such as to allow structural flexing of the stub frame operatively away from and toward the hood assembly, said means comprising fastening elements at the strut means releasably fastening thereto certain portions of the hood assembly adjacent the rearward sides of the engine compartment and elements releasably fastening portions of the hood assembly rearwardly of the said certain portions to the cowl and dash structure and pillars.

4. In motor vehicle structure having a driver's compartment provided in the body thereof; pillars at each side of the forward end of said compartment, cowl and dash structure forwardly of said compartment structurally secured to said pillars, underpan structure under said compartment connectibly supporting said cowl and dash structure and pillars and comprising longitudinal sill members and transverse channel-like reinforcement members therebetween; diagonal strut means fastened to the cowl and dash structure and having engageable portions projecting generally downwardly and forwardly thereof; front chassis sub-assembly comprising a frame having a portion providing front spring suspension for the vehicle and an engine supported by the frame, said frame being formed with spaced side rails having portions each connected at spaced locations for support to members in said underpan structure and being connected at a location intermediate the rear end portions and spring suspension to said engageable portions of the diagonal strut means; hood assembly having an engine compartment connected to the side shields and fenders; means disposed for supporting the hood assembly fastener-free of the front chassis sub-assembly from the vicinity of the diagonal strut means forwardly in a manner such as to allow structural flexing of the frame operatively away from and toward the hood assembly, said means comprising fastening elements at the strut means fastening thereto certain portions of the hood assembly adjacent the rearward sides of the engine compartment and elements fastening portions of the hood assembly rearwardly of the said certain portions to the cowl and dash structure and pillars.

5. In motor vehicle structure having a driver's compartment provided in the body thereof; pillars at each side of the forward end of said compartment, cowl and dash structure forwardly of said compartment structurally secured to said pillars, underpan structure under said compartment connectibly supporting said cowl and dash structure and pillars and comprising longitudinal sill members and transverse channel-like reinforcement members therebetween; diagonal strut means fastened to the cowl and dash structure and having end portions projecting generally downwardly and forwardly thereof; front chassis sub-assembly comprising a stub frame having a portion providing front spring suspension for the vehicle and an engine supported by the stub frame, said stub frame being formed with spaced side rails having rear end portions both connected to members in said underpan structure and being connected at a location intermediate the rear end portions and spring suspension to said end portions of the diagonal strut means; hood assembly having an engine compartment and comprising side shields and fenders at the sides thereof constituting front wheel houses, nose framework at the front of the engine compartment, and hood door structure; means disposed for supporting the hood assembly fastener-free of the front chassis sub-assembly from the vicinity of the diagonal strut means forwardly in a manner such as to allow structural flexing of the stub frame operatively away from and toward the hood assembly, means comprising fastening elements at the strut means releasably fastening thereto the side shields adjacent the rearward sides of the engine compartment of the hood assembly, and elements fastening the side shield-fender-hood-door structure to the cowl and dash structure and pillars rearwardly of the engine compartment.

6. In a motor vehicle construction having a driver's compartment provided in the body thereof, underpan structure having a forward portion extending under the forward part of the driver's compartment and comprising longitudinal sill members and transverse channel-like reinforcement members therebetween; cowl and dash structure joined to the forward end of the underpan structure and supported thereon for disposition forwardly of the driver's compartment; a stub frame comprising substantially parallel side rail portions at opposite sides of the vehicle, a transverse cross member therebetween providing front wheel suspension support, engageable means formed on the top side of the parallel side rail portions, and opposed side rail portions outwardly offset from the parallel side rail portions and forming a rearward continuation thereof, said offset side rail portions having rearwardly diverging end portions resiliently connected to members in the forward portion of the underpan structure; and brace means including rearwardly inclined struts resiliently engaging the engageable means on the parallel side rail portions and disposed to lie substantially along vertical planes containing each said side rail portion, each strut having an upper end engaging the cowl and dash structure.

7. In a motor vehicle construction having a driver's compartment provided in the body thereof, underpan structure having a forward portion extending under the forward part of the driver's compartment and comprising longitudinal sill members and transverse channel-like reinforcement members therebetween; cowl and dash structure joined to the forward end of the underpan structure and supported thereon for disposition forwardly of the driver's compartment; a stub frame comprising substantially parallel side rail portions at opposite sides of the vehicle, a transverse cross member therebetween providing front wheel suspension support, engageable means formed on the top side of the parallel side rail portions, and opposed side rail portions outwardly offset from the parallel side rail portions and forming a rearward continuation thereof, said offset side rail portions having rearwardly diverging end portions resiliently connected to members in the forward portion of the underpan structure; and brace means including rearwardly inclined struts resiliently engaging the engageable means on the parallel side rail portions and disposed to lie substantially along vertical planes containing each said side rail portion, each strut having an upper end engaging the cowl and dash structure at locations substantially within said vertical planes, and struts for transmitting side thrusts having one end connected to each of the first-named struts and the opposite end connected to the cowl and dash structure at locations outwardly offset to the locations within said vertical planes.

8. In a motor vehicle construction having a driver's compartment provided in the body thereof, underpan structure having a forward portion extending under the forward part of the driver's compartment and comprising longitudinal sill members and transverse channel-like reinforcement members therebetween; cowl and dash structure joined to the forward end of the underpan structure and supported thereon for disposition forwardly of the driver's compartment; a frame comprising substantially parallel side rail portions at opposite sides of the vehicle, a transverse cross member therebetween providing front wheel suspension support, engageable means formed on the top side of the parallel side rail portions, and opposed side rail portions outwardly offset from the parallel side rail portions and forming a rearward continuation thereof, said offset side rail portions having rearwardly diverging portions resiliently connected to members in the underpan structure; and brace means including rearwardly inclined struts resiliently engaging the engageable means on the parallel side rail portions and disposed to lie substantially along vertical planes containing each side rail portion, each strut having an upper end engaging the cowl and dash structure at locations substantially within said vertical planes, and struts having one end intermediately connected to each of the first-named struts and the opposite end connected to the cowl and dash structure at locations horizontally aligned outwardly offset to the locations within said vertical planes.

9. An automotive vehicle comprising engine and hooded body units, independently road supported, said engine unit being unstably supported and comprising a supporting framework and an engine, said hooded body unit having a plurality of transverse body members and bolts fitted with resilient compression pads therearound yieldably connecting each said transverse body member to said supporting framework, said supporting framework having a pair of spaced portions adjacent opposite sides of the hood of the hooded body unit and means associated therewith including resilient compression pads interposedly spacing said units for preventing physical engagement of the hood and body unit and the spaced portions of the supporting framework.

10. A motor vehicle body having certain transverse members and another transverse member generally at one end thereof, hood sides extending beyond the aforesaid members, a two-wheeled frame unit comprising a portion connected to at least one of said certain transverse members and a pair of spaced portions adjacent the opposite undersides of the hood sides in operative spacing generally therebelow, and projecting arms mounted at one end to and thereby footing on said other transverse member, said arms having at the other end means engaging said pair of spaced portions adjacent the opposite undersides of the hood sides and further having portions in structural connection with the hood sides for insuring said operative spacing therebelow of the said pair of spaced portions of said frame unit.

11. A motor vehicle body having certain transverse members and another transverse member generally at one end thereof, hood sides extending beyond the aforesaid members, a two-wheeled frame unit comprising a portion connected to at least one of said certain transverse members and a pair of spaced portions adjacent the opposite undersides of the hood sides in operative spacing generally therebelow, and projecting arms mounted at one end to and thereby footing on said other transverse member, said arms having at the other end means yieldingly engaging said pair of spaced portions adjacent to opposite undersides of the hood sides and further having intermediate bracket portions in structural connection with the hood sides for insuring said operative spacing therebelow of said pair of spaced portions of said frame unit.

12. In motor vehicle structure having a body provided with a driver's compartment: a dash at the forward end of said compartment and pillars at each side thereof, means including cowl sides joined to and mounting the dash to said pillars, a two-wheeled frame unstably road-supported and adapted to support the vehicle body adjacent said compartment, said frame having spaced portions located forwardly of said dash, and braces acting between said spaced portions and dash and having ends footing on the latter in a manner such as to thrust thereon at locations in spacing to the cowl sides and to each other, said dash having bracing formed in juxtaposed association therewith generally between said cowl sides transversely to said compartment and being arranged to transmit the thrust from said spaced locations to said juncture thereof with the cowl sides for introduction into said pillars.

13. In a motor vehicle structure having a body provided with a driver's compartment: a dash at the forward end of said compartment and pillars at each side thereof, means including cowl sides joined to and mounting the dash to said pillars, a frame having spaced portions located forwardly of said dash, and braces acting between said spaced portions and dash and having ends footing on the latter in a manner such as to thrust thereon at locations in spacing to the cowl sides and to each other, said dash being arranged to transmit the thrust from said spaced locations to said juncture thereof with the cowl sides and thence to said pillars, said cowl sides having medially situate bracing structure between said juncture and pillars cooperating to introduce thrust loading into the pillars.

14. In motor vehicle structure having a plurality of compartments and a body defining at least one compartment thereof, sheet metal joined to the body forming another compartment, said sheet metal having a free end remote to the junction with said body and intermediate sides forming sides walls for said other compartment, diagonal bracing for structurally connecting said body and intermediate sides of the sheet metal and having a base, and a frame directly connectible to the body in disposition adjacent said intermediate sides of the sheet metal and extending non-interferingly at least in an up and down sense along the free end thereof, said frame having wheel carrying portions in longitudinal spacing to said bracing and spaced longitudinal portions occupying the space therebetween, said last-named portions being adapted for structurally connecting with the base of the bracing and through the latter supporting the intermediate sides and free end of said sheet metal.

15. In motor vehicle structure having a plurality of compartments and a body defining at least one compartment thereof, sheet metal joined to the body forming another compartment, said sheet metal having a free end remote to the junction with said body and intermediate sides forming side walls for said other compartment, diagonal bracing for structurally connecting said body and intermediate sides of the sheet metal and having a base, and a frame directly connectible to the body in disposition adjacent said intermediate sides of the sheet metal and extending non-interferingly in an up and down sense along the free end thereof, said frame having wheel carrying portions in longitudinal spacing to said bracing and spaced longitudinal portions occupying the space therebetween, said last-named portions being adapted for structurally connecting with the base of the bracing and through the latter supporting the intermediate sides and free end of said sheet metal, said bracing having rubber blocks interposed at at least one of its structural connections aforesaid.

16. In motor vehicle structure having a plurality of compartments and a body defining at least one compartment thereof, sheet metal joined to the body forming another compartment, said sheet metal having a free end remote to the junction with said body and intermediate sides forming side walls for said other compartment, diagonal bracing for structurally connecting said body and intermediate sides of the sheet metal and having a base, and a frame directly connectible to the body in disposition adjacent said intermediate sides of the sheet metal and extending non-interferingly in an up and down sense along the free end thereof, said frame having wheel carrying portions in longitudinal spacing to said bracing and spaced longitudinal portions occupying the space therebetween, said last-named portions being adapted for structurally connecting with the base of the bracing and through the latter supporting the intermediate sides and free end of said sheet metal, said bracing having rubber blocks interposed at at least one of its structural connections aforesaid and including a compression strut in a common vertical plane with each said spaced longitudinal portion of the frame.

17. In motor vehicle structure having a plurality of compartments and a body defining at least one compartment thereof, sheet metal joined to the body forming another compartment, said sheet metal having a free end remote to the junction with said body and intermediate sides forming side walls for said other compartment, diagonal bracing for structurally connecting said body and intermediate sides of the sheet metal, and a longitudinal frame provided with transversely spaced parts at and along the opposite undersides of said sheet metal and vehicle structure, said longitudinal frame having first and second groups of rubber blocks arranged thereon for engaging respectively the body and base of the bracing, and supporting the body and through said bracing and intermediate sides supporting the free end of the sheet metal.

18. In a motor vehicle characterized by an engine compartment and a driver's compartment, a construction having cowl and dash structure separating said compartments, underpan structure forming the enclosure for the bottom of said driver's compartment, said underpan structure including a structural sheet metal portion and transversely disposed reinforcing members, an elongated hood and fender assembly forming the enclosure for the front and sides of the engine compartment, rearwardly inclining braces in the engine compartment connected at one end with said cowl and dash structure, said hood and fender assembly being structurally mounted to said cowl and dash structure and forming a self-supporting overhanging structure, and a rigid frame disposed at the bottom of the engine compartment having front engine mounting and wheel support structure forming one portion thereof, another portion of said frame being secured to said underpan structure at a plurality of longitudinally spaced positions, said braces being structurally secured to said frame, said one frame portion and said hood and fender assembly each forming a cantilever structure adapted to be independently deflected when subjected to external forces.

19. In a self-supporting automobile body: side sills extending rearwardly from points adjacent the rear of front wheel locations; front posts connected to the forward portions of said side sills; a floor panel interconnecting said side sills and extending forwardly at least to said posts, a cross beam interconnecting forward portions of said side sills; sill members inwardly offset with respect to said side sills and extending forwardly from said cross beam to which they are secured; said cross beam having at least its mid portion including the attachment zone for said sill members, arranged rearwardly of the location of said posts; said sill members being connected to said floor panel forwardly of said cross beam; a cross member inserted between said sill members adjacent rearward portions thereof and forwardly spaced from said cross beam, said cross member being adapted for at least in part supporting the motor of the automobile, and means bracing forward portions of said sill members against the middle part of the body above said side sills.

References Cited in the file of this patent

UNITED STATES PATENTS

| | | |
|---|---|---|
| Re. 20,171 | Curtiss | Nov. 17, 1936 |
| 1,948,745 | Curtiss | Feb. 27, 1934 |
| 2,015,682 | Kliesrath | Oct. 1, 1935 |
| 2,047,336 | Stout | July 14, 1936 |
| 2,058,580 | Evans | Oct. 27, 1936 |
| 2,074,158 | Avery | Mar. 16, 1937 |
| 2,139,750 | Hicks | Dec. 13, 1938 |
| 2,177,896 | Lee | Oct. 31, 1939 |
| 2,193,949 | Tibbetts | Mar. 19, 1940 |

(Other references on following page)

UNITED STATES PATENTS

| | | |
|---|---|---|
| 2,208,709 | Tjaarda | July 23, 1940 |
| 2,248,319 | Waterhouse | July 8, 1941 |
| 2,261,860 | Saives | Nov. 4, 1941 |
| 2,324,677 | Cadwallader | July 20, 1943 |
| 2,373,356 | Thoms et al. | Apr. 10, 1945 |
| 2,384,096 | Kishline | Sept. 4, 1945 |
| 2,606,625 | Paton | Aug. 12, 1952 |
| 2,633,203 | Paton | Mar. 31, 1953 |

FOREIGN PATENTS

| | | |
|---|---|---|
| 245,565 | Switzerland | Nov. 17, 1947 |

U. S. DEPARTMENT OF COMMERCE

PATENT OFFICE

CERTIFICATE OF CORRECTION

Patent No. 2,817,557                                                                  December 24, 1957

Donald F. Reynolds

It is hereby certified that error appears in the printed specification of the above numbered patent requiring correction and that the said Letters Patent should read as corrected below.

Column 3, line 68, for "clearnace" read --clearance--; column 5, line 72, for "34" read --314--; column 9, line 45, for "same" read --said--.

Signed and sealed this 4th day of March 1958.

(SEAL)
Attest:
KARL H. AXLINE

Attesting Officer

ROBERT C. WATSON
                                                    Commissioner of Patents